(12) United States Patent
Huang et al.

(10) Patent No.: US 10,660,091 B2
(45) Date of Patent: May 19, 2020

(54) METHOD AND APPARATUS FOR HANDLING SFI (SLOT FORMAT INFORMATION) COLLISION IN A WIRELESS COMMUNICATION SYSTEM

(71) Applicant: ASUSTek Computer Inc., Taipei (TW)

(72) Inventors: Chun-Wei Huang, Taipei (TW);
Ko-Chiang Lin, Taipei (TW);
Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/050,862

(22) Filed: Jul. 31, 2018

(65) Prior Publication Data

US 2019/0053227 A1 Feb. 14, 2019

Related U.S. Application Data

(60) Provisional application No. 62/543,929, filed on Aug. 10, 2017.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0094* (2013.01); *H04L 5/0098* (2013.01);
(Continued)

(58) Field of Classification Search
None
See application file for complete search history.

(56) References Cited

U.S. PATENT DOCUMENTS

| 2009/0238248 A1* | 9/2009 | Myers | H04B 1/7085 |
| | | | 375/149 |
| 2010/0008334 A1* | 1/2010 | Doi | H04W 74/0816 |
| | | | 370/336 |

(Continued)

OTHER PUBLICATIONS

Nokia, Alcatel-Lucent Shanghai Bell, On the UE behaviour related to group common PDCCH in NR[online], 3GPP TSG RAN WG1 adhoc_NR_AH_1706, 3GPP, Jun. 30, 2017, R1-1710986, searched date[Jun. 24, 2019], internet<URL:http://www.3gpp.org/ftp/tsg_ran/WG1_RL1/TSGR1_AH/NR_AH_1706/Docs/R1-1710986.zip>.

(Continued)

*Primary Examiner* — Bunjob Jaroenchonwanit
(74) *Attorney, Agent, or Firm* — Blue Capital Law Firm, P.C.

(57) ABSTRACT

A method and apparatus are disclosed from the perspective of a network node. In one embodiment, the method includes the network node transmitting a first slot format information (SFI) to a User Equipment (UE), wherein the first SFI indicates transmitted direction of symbols of a first set of slots. The method also includes the network node transmitting a second SFI carried by a group common physical downlink control channel (PDCCH) to the UE, wherein the second SFI indicates transmitted direction of symbols of a second set of slots, and wherein if the first set of slots and the second set of slots are partially overlapped in time domain and the second SFI is transmitted after the first SFI, transmitted direction of overlapped symbols indicated by the second SFI is aligned with transmitted direction of the overlapped symbols indicated by the first SFI.

18 Claims, 14 Drawing Sheets

(51) Int. Cl.
H04L 25/03 (2006.01)
H04W 74/08 (2009.01)
(52) U.S. Cl.
CPC ... *H04L 25/03006* (2013.01); *H04W 74/0825* (2013.01); *H04L 5/001* (2013.01); *H04L 5/0048* (2013.01); *H04L 5/0053* (2013.01); *H04L 2025/03414* (2013.01)

(56) References Cited

U.S. PATENT DOCUMENTS

| | | | | |
|---|---|---|---|---|
| 2014/0146697 | A1* | 5/2014 | Kim | H04B 7/0413 370/252 |
| 2015/0208247 | A1* | 7/2015 | Sinsuan | H04W 28/06 370/337 |
| 2017/0161773 | A1* | 6/2017 | Xu | G06F 16/2455 |
| 2017/0188357 | A1* | 6/2017 | Visotsky | H04W 72/0446 |
| 2018/0279304 | A1* | 9/2018 | Lee | H04L 5/0094 |
| 2018/0309513 | A1* | 10/2018 | Kim | H04B 7/2643 |
| 2018/0367289 | A1* | 12/2018 | Kim | H04L 5/14 |
| 2019/0045481 | A1* | 2/2019 | Sang | H04W 76/12 |
| 2019/0053227 | A1* | 2/2019 | Huang | H04L 5/0098 |
| 2019/0159191 | A1* | 5/2019 | Kim | H04L 5/00 |
| 2019/0165904 | A1* | 5/2019 | Jo | H04L 5/005 |
| 2019/0245648 | A1* | 8/2019 | Jo | H04L 5/00 |

OTHER PUBLICATIONS

Spreadtrum Communications, The relation among UE-specific DCI, GC-PDCCH, and semi-static signaling[online], 3GPP TSG RAN WG1 adhoc_NR_AH_1706, 3GPP, Jun. 30, 2017, R1-1710368, searched date[Jun. 24, 2019], internet<URL:http://www.3gpp.org/ftp/tsg_ran/WG1_RL1/TSGR1_AH/NR_AH_1706/Docs/R1-1710368.zip>.

CATT, Configuration and monitoring of the group-common PDCCH[online], 3GPP TSG RAN WG1 adhoc_NR_AH_1706, 3GPP, Jun. 30, 2017, R1-1710082, searched date[Jun. 30, 2019], internet<URL:http://www.3gpp.org/ftp/tsg_ran/WG1_RL1/TSGR1_AH/NR_AH_1706/Docs/R1-1710082.zip>.

Office Action from Japan Patent Office in corresponding JP Application No. 2018-143080, dated Jul. 2, 2019.

CATT, "[89-20] email discussion: Group-common PDCCH for NR", 3GPP TSG RAN WG1 Meeting #AH_NR2, R1-17xxxxx, Jun. 27-30, 2017.

Office Action from Taiwan Patent Office in corresponding TW Application No. 107126591, dated May 31, 2019.

NTT Docomo et al: "Views on UE behavior for group-common PDCCH", 3GPP Draft; R1-1711096, 3rd Generation Partnership Project (3GPP), Mobile Competence Centre ; 650, Route Des Lucioles ; F-06921 Sophia-Antipolis Cedex ;France vol. RAN WG1, No. Qingdao, P.R. China; Jun. 27, 2017-Jun. 30, 2017 Jun. 26, 2017.

CMCC: "UE behavior related to dynamic and semi-static configured resources", 3GPP Draft; R1-1710781, 3rd Generation Partnership Project (3GPP), Mobile Competence Centre ; 650, Route Des Lucioles ; F-06921 Sophia-Antipolis Cedex ;France vol. RAN WG1, No. Qingdao, P.R. China; Jun. 27, 2017-Jun. 30, 2017 Jun. 26, 2017.

Spreadtrum Communications: "The relation among UE-specific DCI, GC-PDCCH, and semi-static signaling" 3GPP Draft; R1-1710368_The Relation Among UE-Specific DCI, GC-PDCCH, and Semi-Static Signaling_Final, 3rd Generation Partnership Project (3GPP), Mobile Competence Centre ; 650, Route Des Lucioles ; F-, vol. RAN WG1, No. Qingdao, China; Jun. 27, 2017-Jun. 30, 2017 Jun. 26, 2017.

Intel Corporation: "Group-common PDCCH: UE behavior", 3GPP Draft; R1-1710549 Intel GC-PDCCHUEBEHVR, 3rd Generation Partnership Project (3GPP), Mobile Competence Centre ; 650, Route Des Lucioles ; F-06921 Sophia-Antipolis Cedex ;France vol. RAN WG1, No. Qingdao, P.R. China; Jun. 27, 2017-Jun. 30, 2017 Jun. 26, 2017.

European Search Report from corresponding EP Application No. 18186450.5, dated Nov. 23, 2018.

* cited by examiner

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity. |
| DCI format 1A | Common | If the number of PBCH antenna ports is one, Single-antenna port, port 0 is used, otherwise Transmit diversity |

FIG. 5 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

FIG. 6 (PRIOR ART)

| DCI format | Search Space | Transmission scheme of PDSCH corresponding to PDCCH |
|---|---|---|
| DCI format 1C | Common | If the number of PBCH antenna ports is one, Single-antenna port, port 0 is used, otherwise Transmit diversity |
| DCI format 1A | Common | If the number of PBCH antenna ports is one, Single-antenna port, port 0 is used, otherwise Transmit diversity |

FIG. 7 (PRIOR ART)

METHOD AND APPARATUS FOR HANDLING SFI (SLOT FORMAT INFORMATION) COLLISION IN A WIRELESS COMMUNICATION SYSTEM

CROSS-REFERENCE TO RELATED APPLICATIONS

The present application claims the benefit of U.S. Provisional Patent Application Ser. No. 62/543,929 filed on Aug. 10, 2017, the entire disclosure of which is incorporated herein in its entirety by reference.

FIELD

This disclosure generally relates to wireless communication networks, and more particularly, to a method and apparatus for handling SFI collision in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a network node. In one embodiment, the method includes the network node transmitting a first slot format information (SFI) to a User Equipment (UE), wherein the first SFI indicates transmitted direction of symbols of a first set of slots. The method also includes the network node transmitting a second SFI carried by a group common physical downlink control channel (PDCCH) to the UE, wherein the second SFI indicates transmitted direction of symbols of a second set of slots, and wherein if the first set of slots and the second set of slots are partially overlapped in time domain and the second SFI is transmitted after the first SFI, transmitted direction of overlapped symbols indicated by the second SFI is aligned with transmitted direction of the overlapped symbols indicated by the first SFI.

BRIEF DESCRIPTION OF THE DRAWINGS

FIG. 5 is a reproduction of Table 7.1-1 of 3GPP TS 36.213 v14.3.0.

FIG. 6 is a reproduction of Table 7.1-2 of 3GPP TS 36.213 v14.3.0.

FIG. 7 is a reproduction of Table 7.1-3 of 3GPP TS 36.213 v14.3.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standards offered by a consortium named "3rd Generation Partnership Project" referred to herein as 3GPP, including: TSG RAN WG1 AH Meeting #1701 RAN1 Chairman's Notes; TSG RAN WG1 Meeting #88b RAN1 Chairman's Notes; TSG RAN WG1 Meeting #89 RAN1 Chairman's Notes; TSG RAN WG1 AH Meeting #1706 RAN1 Chairman's Notes; R1-1710476, "UE behavior related to group-common PDCCH", Huawei and HiSilicon, Qingdao, China, 27-30 Jun. 2017; TR 38.802 v14.1.0, "Study on New Radio, Access Technology, Physical Layer Aspects"; TR 38.913 v14.0.0, "Study on Scenarios and Requirements for Next Generation Access Technologies"; R1-1711184, "Contents of group common PDCCH", Qualcomm Incorporated, Qingdao, China, 27-30 Jun. 2017; and TS 36.213 v14.3.0, "E-UTRA Physical layer procedures".

Furthermore, the exemplary wireless communication systems and devices described below may be designed to support one or more standards such the standards offered by a consortium named "KT PyeongChang 5G Special Interest Group" referred to herein as KT 5G-SIG, including: TS 5G.213 v1.9, "KT 5G Physical layer procedures (Release 1)"; TS 5G.321 v1.2, "KT 5G MAC protocol specification (Release 1)"; TS 5G.211 v2.6, "KT 5G Physical channels and modulation (Release 1)"; and TS 5G.331 v1.0, "KT 5G Radio Resource Control (RRC) Protocol specification (Release 1)".

The standards and documents listed above are hereby expressly incorporated by reference in their entirety.

Figure 1:
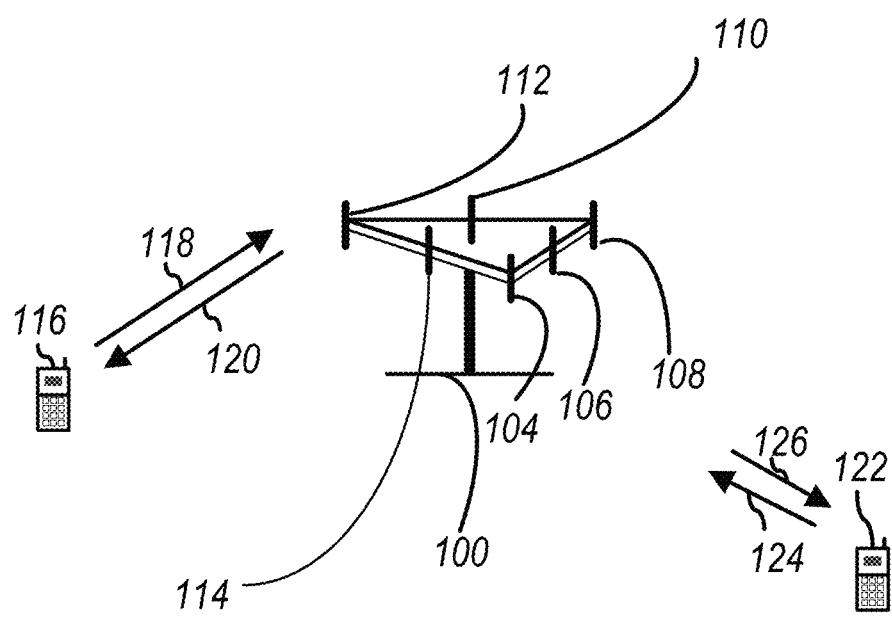
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
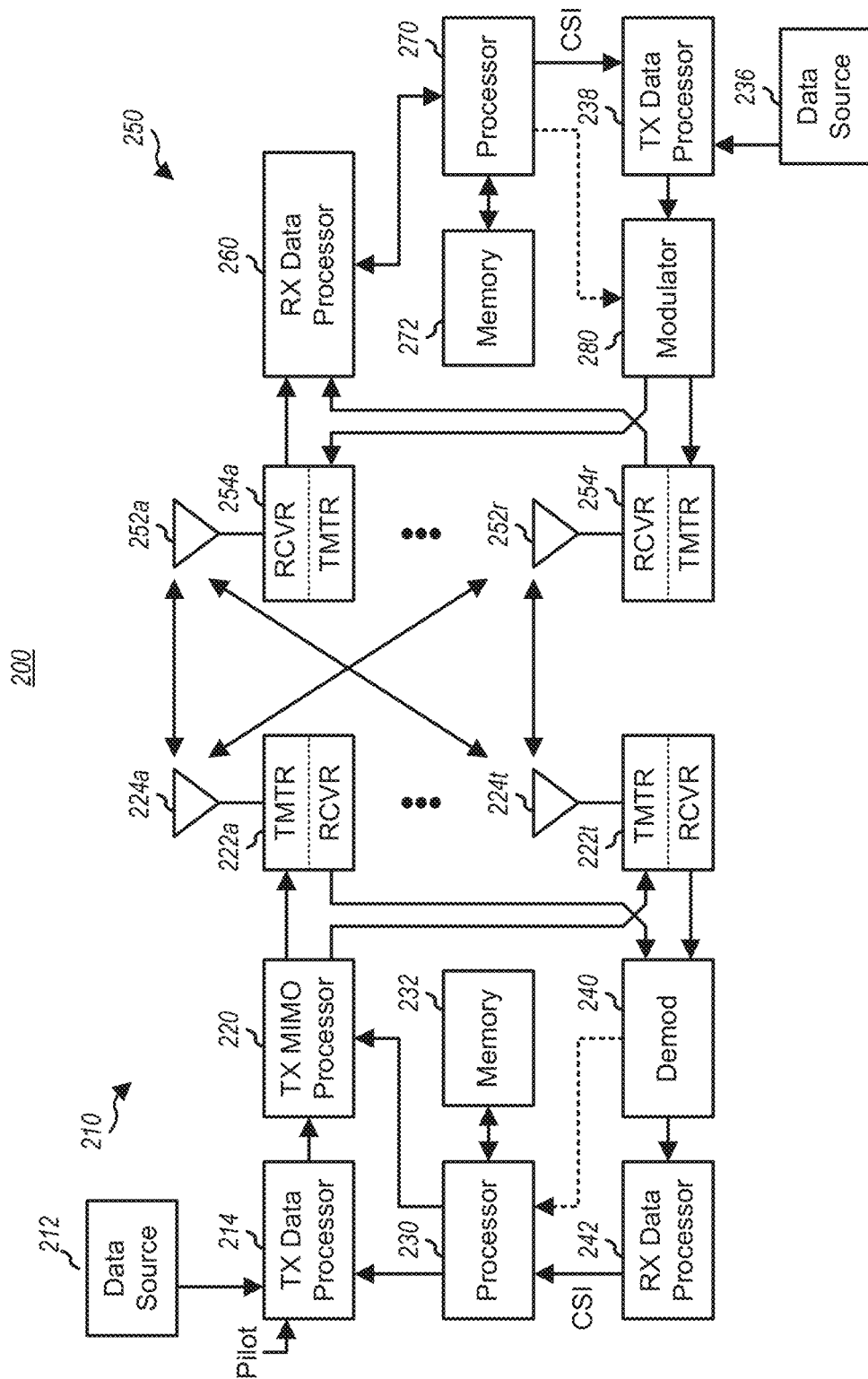
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
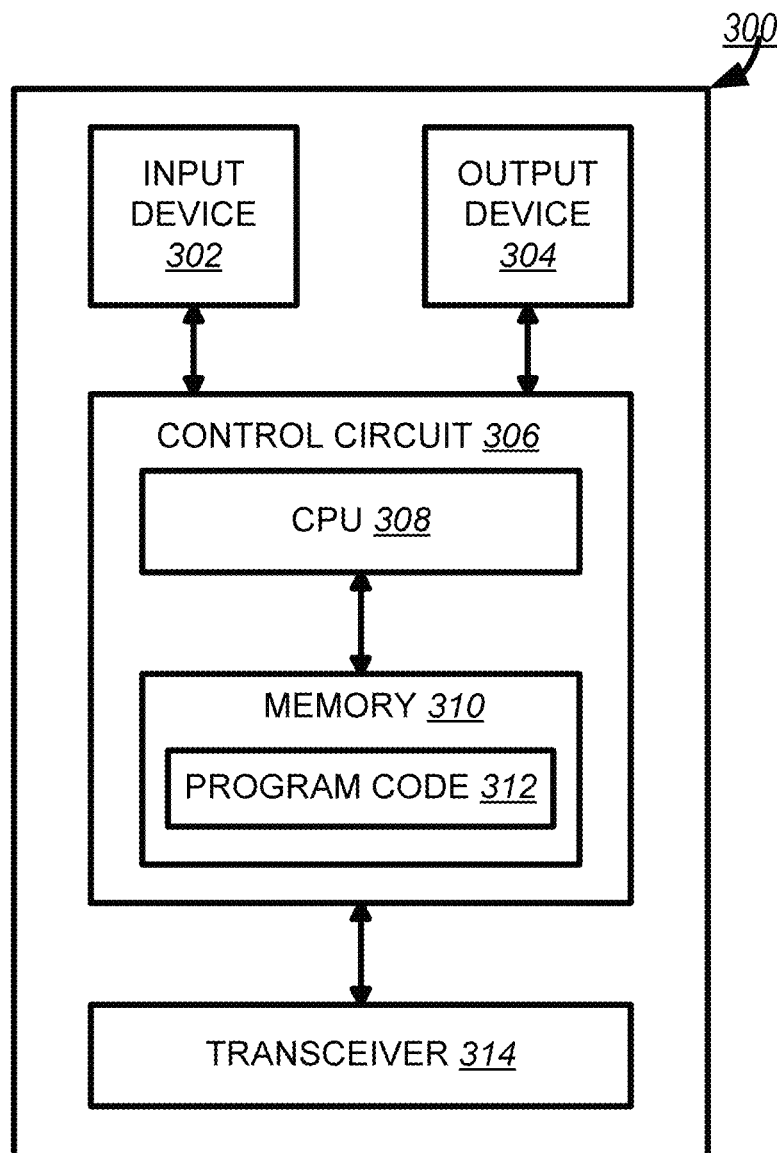
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314.

The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
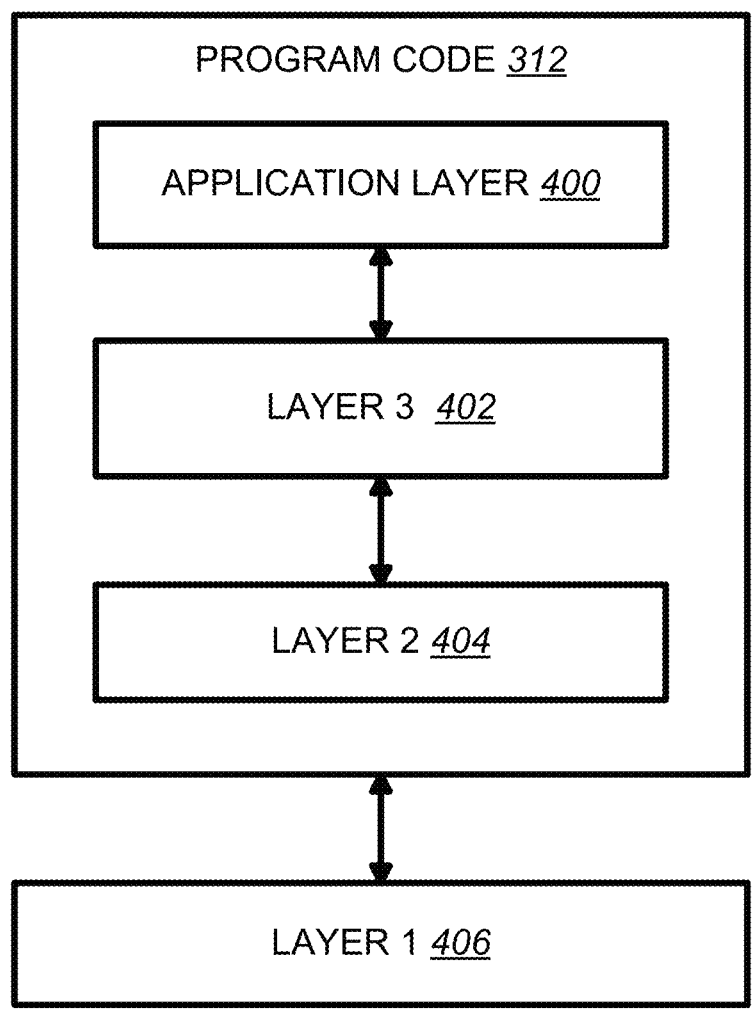
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

As discussed in 3GPP TSG RAN WG1 AH Meeting #1701 RAN1 Chairman's Notes, RAN1 made some agreements about group common PDCCH as follows:

Agreements:
  NR supports a 'group common PDCCH' carrying information of e.g. the slot structure.
    If the UE does not receive the 'group common PDCCH' the UE should be able to receive at least PDCCH in a slot, at least if the gNB did not transmit the 'group common PDCCH'.
    The network will inform through RRC signalling the UE whether to decode the 'group common PDCCH' or not
    Common does not necessarily imply common per cell.
    Continue the discussion on the detailed content of the 'group common PDCCH' including usage for TDD and FDD
    The term 'group common PDCCH' refers to a channel (either a PDCCH or a separately designed channel) that carries information intended for the group of UEs.
Agreements:
  The staring position of downlink data in a slot can be explicitly and dynamically indicated to the UE.
    FFS: signaled in the UE-specific DCI and/or a 'group-common PDCCH'
    FFS: how and with what granularity the unused control resource set(s) can be used for data
Agreements:
  The UE will have the possibility to determine whether some blind decodings can be skipped based on information on a 'group common PDCCH' (if present).
    FFS: if the data starting position is signaled on the group common PDCCH, the UE may exploit this information to skip some blind decodings
    FFS: if the end of the control resource set is signaled on the 'group common PDCCH', the UE may exploit this information to skip some blind decodings
    FFS: how to handle the case when there is no 'group common PDCCH' in a slot
    When monitoring for a PDCCH, the UE should be able to process a detected PDCCH irrespective of whether the 'group common PDCCH' is received or not Agreements:
  'Slot format related information'
    Information from which the UE can derive at least which symbols in a slot that are 'DL', 'UL' (for Rel-15), and 'other', respectively
    FFS: if 'other' can be subdivided into 'blank', 'sidelink', etc
  FFS: 'Control resource set duration'
    FFS: Indicates the duration of the control resource set(s)
    FFS: Can help the UE skip some of the semi-statically configured blind decodings. If not received, the UE performs all blind decodings.

As discussed in 3GPP TSG RAN WG1 Meeting #88b RAN1 Chairman's Notes, some agreements are made for slot format indication as follows:

Agreements:
  From UE signaling perspective,
    The higher layer signalling for the semi-static assignment of DL/UL transmission direction for NR can achieve at least the followings
      A periodicity where the configuration applies;
        FFS: Detailed periodicity set;
        FFS: how to achieve the signaling of periodicity
      A subset of resources with fixed DL transmission;
        FFS: The subset of resources can be assigned in granularity of slot and/or symbol;
      A subset of resources with fixed UL transmission;
        Resources with fixed UL transmission happens in the ending part of the periodicity is supported;
        FFS: The subset of resources can be assigned in granularity of slot and/or symbol;
      FFS: Other resources not indicated as "fixed UL" or "fixed DL" or "reserved/blank" can be considered as "flexible resource", where transmission direction can be changed dynamically.
Agreements:
  Strive for unified design regardless of whether the DL/UL resource partition is dynamic or semi-static
  UE behaviors at least the following are common regardless of whether the DL/UL resource partition is dynamic or semi-static:
    Scheduling timing between control to the scheduled data
    HARQ-ACK feedback including timing
  Strive for a limited number of semi-static DL/UL resource partition.
  NR may include tools motivated by either dynamic or semi-static.
  FFS: UE behavior if there is a conflict between dynamic and semi-static signaling.
Agreements:
  No new physical channel specific for indication of DL resources being preempted by another DL transmission is introduced
    FFS whether the indication is based on NR-PDCCH or a group common PDCCH
    FFS location of the indication
    FFS timing of the indication 3GPP TSG RAN WG1 Meeting #89 RAN1 Chairman's Notes describes the following agreements about Group Common Physical Downlink Control Channel (GC PDCCH):

Agreements:
  The SFI transmitted in a group-common PDCCH can indicate the slot format related information for one or more slots The slot format related information informs the UEs of the number of slots and the slot format(s) related information of those slots
FFS: how to interpret the SFI when the UE is configured with multiple bandwidth parts
FFS: details for UE behaviour
FFS: A UE may be configured to monitor for at most one group-common PDCCH carrying slot format related information (SFI) in a slot Agreements:
Regarding to the periodicity that included in the higher layer signalling for the semi-static assignment of DL/UL transmission direction for NR, at least the following values are supported:
[Roughly 0.125 ms, roughly 0.25 ms,] 0.5 ms, 1 ms, 2 ms, 5 ms, 10 ms;
Each periodicity is supported for particular SCS(s)/slot duration(s)
FFS: details Agreements:
In 'Slot format related information', 'other' is at least:
'Unknown'
UE shall not assume anything for the symbol with 'Unknown' by this information
FFS: UE behavior when the UE receives the information for the symbol from SFI and broadcast DCI and/or UE-specific DCI and/or semi-static signaling/configuration
FFS: 'Empty'
UEs can use this resource for interference measurement
UE may assume there is no transmission As discussed in 3GPP TSG RAN WG1 AH Meeting #1706 RAN1 Chairman's Notes, RAN1 agreed to a coreset for monitoring GC PDCCH as follows:
Agreements:
In 'Slot format related information', 'Empty' is not indicated explicitly.
Note: RAN1 specification ensures that UE(s) is/are aware of which resources can be for 'gap for DL-UL switching' and/or 'gap'
Note: RAN1 specification ensures that UE(s) is/are aware of which resources are for 'CSI/interference measurement'.

Agreements:
UE is configured with a CORESET to monitor group-common PDCCH.
When configured, the group-common PDCCH follows the same CORESET configuration (e.g., REG-to-CCE mapping) of the CORESET.
A group-common PDCCH is formed by an integer number of CCEs.
The CORESET for the monitored group-common PDCCH carrying SFI can be the same or different from the CORESET for the monitored PDCCH for other types of control signalling.

As discussed in 3GPP R1-1710476, companies' discussion about GC can be defined based on following basis:
UE Behavior with 'Group-Common PDCCH' in Multi-Bandwidth Part Case
During previous meetings, it was agreed that one or multiple bandwidth part configurations for each component carrier can be semi-statically signalled to a UE, where each bandwidth part is associated with a specific numerology (sub-carrier spacing, CP type). Therefore, slot format related information (SFI) in a slot can be indicated in several ways as follows.

Option 1: on a per component carrier basis
Option 2: on a per numerology basis
Option 3: on a per bandwidth part basis
In the remaining of this section, detailed considerations on UE behavior are provided with the respect to the three options. Note that for the 'group-common PDCCH', NR meeting has not precluded the possibility of either a regular NR-PDCCH or a separately designed structure. Specifically, the former one refers to one or multiple CCEs used for PDCCH transmission so that it is easy to multiplex with regular NR-PDCCH, while the latter one refers to a PCFICH-like or a PHICH-like channel when a small payload size is targeted. Therefore, both structures will be embraced in the discussions.

3GPP TR 38.802 describes the following concepts about control channel:
At least QPSK is supported for the modulation of the NR-PDCCH. For single stage DCI, modulation scheme for NR-PDCCH is only QPSK. In frequency-domain, a PRB (or a multiple of PRBs) is the resource unit size (may or may not including DM-RS) for control channel. A NR-PDCCH candidate consists of a set of NR-CCEs. A NR-CCE consists of a fixed number of resource element groups (REGs). A REG is one RB during one OFDM symbol which may or may not include DM-RS. This is at least for the case where the DL control region consists of one or a few OFDM symbol(s) of a slot or a mini-slot. At least for eMBB, in one OFDM symbol, multiple NR-CCEs cannot be transmitted on the same REG except for spatial multiplexing to different UEs (MU-MIMO).
At least for single stage DCI design, a UE monitors for downlink control information in one or more control resource sets where a control resource set is defined as a set of REGs under a given numerology. The BW for control resource set is smaller than or equal to the carrier bandwidth (up to a certain limit). The control resource set is a set of REGs within which the UE attempts to blindly decode downlink control information. The REGs may or may not be frequency contiguous. When the control resource set spans multiple OFDM symbols, a control channel candidate is mapped to multiple OFDM symbols or to a single OFDM symbol. The gNB can inform UE which control channel candidates are mapped to each subset of OFDM symbols in the control resource set. This does not preclude that UE may receive additional control information elsewhere within or outside the control resource set in the same or different OFDM symbol(s). A UE may have one or more control resource sets. NR should support dynamic reuse of at least part of resources in the control resource sets for data for the same or a different UE, at least in the frequency domain. From gNB perspective, DL control channel can be located at the first OFDM symbol(s) in a slot and/or mini-slot. UE-specific DL control information monitoring occasions at least in time domain can be configured. At least for single-stage DCI design, for slots, minimum granularity of DCI monitoring occasion is once per slot.
The time/frequency resource containing at least one search space is obtained from MIB/system information/implicitly derived from initial access information. Time/frequency resource containing additional search spaces, can be configured using dedicated RRC signaling. NR-PDCCH can be mapped contiguously or non-contiguously in frequency. Multiple control resource sets can be overlapped in frequency and time for a UE. A search space in NR is associated with a single control resource set. The search spaces in different control resources sets are defined independently. Each candidate of NR DL control channel search space is composed by K NR-CCE(s). Control search space includes at least, aggregation level(s), number of decoding candidates for each aggregation level, and the set of CCEs for each decoding candidate. The max number of blind decoding candidates for a UE is defined independently of the number of control resource sets and the number of search spaces.

NR supports a group common PDCCH carrying at least slot format related information. If the UE does not receive the group common PDCCH the UE should be able to receive at least PDCCH in a slot, at least if the gNB did not transmit the group common PDCCH. The network will inform through RRC signalling the UE whether to decode the group common PDCCH or not. Note that common does not necessarily imply common per cell. Also, the term group common PDCCH refers to a channel (either a PDCCH or a separately designed channel) that carries information intended for the group of UEs. Slot format related information and defined as information from which the UE can derive at least which symbols in a slot that are DL, UL (for Rel-15), and other, respectively. The UE will have the possibility to determine whether some blind decodings can be skipped based on information on a group common PDCCH (if present). When monitoring for a PDCCH, the UE should be able to process a detected PDCCH irrespective of whether the group common PDCCH is received or not. UE/NR-PDCCH-specific DM-RS and shared/common RS are supported for NR-PDCCH reception. At least for beamforming, UE may assume the same precoding operation for NR-PDCCH and associated DM-RS for NR-PDCCH. The reference signals in at least one search space do not depend on the RNTI or UE-identity. In an additional search space, reference signals can be configured. A UE assumes fixed number of RS REs per REG for control channel rate matching when the REG contains RS REs. For one UE, the channel estimate obtained for one RE should be reusable across multiple blind decodings involving that RE in at least the same control resource set and type of search space (common or UE-specific).

Transmit diversity is supported for NR-PDCCH.

The starting position of downlink data in a slot can be explicitly and dynamically indicated to the UE.

3GPP TR 38.913 describes the following targets of URLLC (Ultra-Reliable and Low Latency Communication):

Control Plane Latency

Control plane latency refers to the time to move from a battery efficient state (e.g., IDLE) to start of continuous data transfer (e.g., ACTIVE).

The target for control plane latency should be 10 ms.

Analytical evaluation is used as the evaluation methodology.

NOTE1: For satellite communications link, the control plane should be able to support RTT of up to 600 ms in the case of GEO and HEO, up to 180 ms in the case of MEO, and up to 50 ms in the case of LEO satellite systems.

User Plane Latency

The time it takes to successfully deliver an application layer packet/message from the radio protocol layer 2/3 SDU ingress point to the radio protocol layer 2/3 SDU egress point via the radio interface in both uplink and downlink directions, where neither device nor Base Station reception is restricted by DRX.

For URLLC the target for user plane latency should be 0.5 ms for UL, and 0.5 ms for DL. Furthermore, if possible, the latency should also be low enough to support the use of the next generation access technologies as a wireless transport technology that can be used within the next generation access architecture.

NOTE1: The reliability KPI also provides a latency value with an associated reliability requirement. The value above should be considered an average value and does not have an associated high reliability requirement.

For eMBB, the target for user plane latency should be 4 ms for UL, and 4 ms for DL.

NOTE2: For eMBB value, the evaluation needs to consider all typical delays associated with the transfer of the data packets in an efficient way (e.g. applicable procedural delay when resources are not preallocated, averaged HARQ retransmission delay, impacts of network architecture).

When a satellite link is involved in the communication with a user equipment, the target for user plane RTT can be as high as 600 ms for GEO satellite systems, up to 180 ms for MEO satellite systems, and up to 50 ms for LEO satellite systems.

NOTE3: For the satellite case, the evaluation needs to consider the max RTT that is associated with the GEO satellite systems.

Analytical evaluation is used as the evaluation methodology.

Reliability

Reliability can be evaluated by the success probability of transmitting X bytes within a certain delay, which is the time it takes to deliver a small data packet from the radio protocol layer 2/3 SDU ingress point to the radio protocol layer 2/3 SDU egress point of the radio interface, at a certain channel quality (e.g., coverage-edge).

A general URLLC reliability requirement for one transmission of a packet is $1\text{-}10^{-5}$ for 32 bytes with a user plane latency of 1 ms.

For eV2X, for communication availability and resilience and user plane latency of delivery of a packet of size [300 bytes], the requirements are as follows:

Reliability=$1\text{-}10^{-5}$, and user plane latency=[3-10 msec], for direct communication via sidelink and communication range of (e.g., a few meters)

Reliability=$1\text{-}10^{-5}$, and user plane latency=[2] msec, when the packet is relayed via BS.

Note that target communication range and reliability requirement is dependent of deployment and operation scenario (e.g., the average inter-vehicle speed).

Link level evaluation with deployment scenario specific operating point and system level simulation are to be performed for the evaluations are Indoor Hotspot, Urban Macro, Highway, and Urban grid for connected car.

[Editor's notes: other KPIs and use cases for eV2X may be added if needed after progress in SA1.]

NOTE: Other reliability requirements may be added, if needed, e.g. for critical communications relating to high-speed train.

3GPP R1-1711184 provides the following examples about SFI contents:

In addition to the already agreed 'DL' and 'UL', 'other' field in slot format indicator is extended to 'Unknown'. Given FDD has fixed directions for each spectrum, we can first focus on TDD use case. Based on the agreement in RAN1 NR Ad-Hoc#1, UE should be able to derive which symbols in a slot that are 'DL', 'UL', 'Unknown' and potentially 'other'. It is natural to see what kinds of slot format is allowed in NR TDD operation first. First, DL centric slot and UL centric slot for the middle data region in TDD slot format as shown in FIG. 1.

Proposal 2: 'slot format related information' should at least support indicating the following slot formats (additional slot formats may be added), [where 2 or 3 DL control region, 1 or 2 UL control region and 1 symbol gap from DL to UL transition are assumed.]

DL centric slot
  12 'DL' symbols+1 'empty' symbol+1 'UL' symbol
  11 'DL' symbols+1 'empty' symbol+2 'UL' symbols
UL centric slot
  2 'DL' symbols+1 'empty' symbol+11 'UL' symbols
  3 'DL' symbols+1 'empty' symbol+10 'UL' symbols
DL only slot
  14 'DL' symbols
UL only slot
  14 'UL' symbols
Slots including 'empty' in addition to the gap ('empty' in any of DL control, DL data, UL data, UL control)
  2 'empty' symbols+10 'DL' symbols+1 'empty' symbol+1 'UL' symbol
  3 'empty' symbols+9 'DL' symbols+1 'empty' symbol+1 'UL' symbol
  2 'empty' symbols+9 'DL' symbols+1 'empty' symbol+2 'UL' symbols
  3 'empty' symbols+8 'DL' symbols+1 'empty' symbol+2 'UL' symbols
  2 'DL' symbols+11 'empty' symbols+1 'UL' symbol
  3 'DL' symbols+10 'empty' symbols+1 'UL' symbol
  2 'DL' symbols+10 'empty' symbol+2 'UL' symbols
  3 'DL' symbols+9 'empty' symbol+2 'UL' symbols
  12 'DL' symbols+2 'empty' symbols
  11 'DL' symbols+3 'empty' symbols
  13 'empty' symbols+1 'UL' symbol
  12 'empty' symbols+2 'UL' symbols
  2 'DL' symbols+12 'empty' symbols
  3 'DL' symbols+11 'empty' symbols
  2 'empty' symbols+10 'DL' symbols+2 'empty' symbols
  3 'empty' symbols+9 'DL' symbols+2 'empty' symbols
  2 'empty' symbols+9 'DL' symbols+3 'empty' symbols
  3 'empty' symbols+8 'DL' symbols+3 'empty' symbols
  3 'empty' symbols+11 'UL' symbols
  4 'empty' symbols+10 'UL' symbols
  2 'DL' symbols+1 'empty' symbol+10 'UL' symbols+1 'empty' symbol
  3 'DL' symbols+1 'empty' symbol+9 'UL' symbols+1 'empty' symbol
  2 'DL' symbols+1 'empty' symbol+9 'UL' symbols+2 'empty' symbol
  3 'DL' symbols+1 'empty' symbol+8 'UL' symbols+2 'empty' symbol
  3 'empty' symbols+10 'UL' symbols+1 'empty' symbol
  4 'empty' symbols+9 'UL' symbols+1 'empty' symbol
  3 'empty' symbols+9 'UL' symbols+2 'empty' symbol
  4 'empty' symbols+8 'UL' symbols+2 'empty' symbol
  2 'empty' symbols+12 'DL' symbols
  3 'empty' symbols+11 'DL' symbols
  13 'UL' symbols+1 'empty' symbol
  12 'UL' symbols+2 'empty' symbols
  14 'empty' symbols
Unknown
  Data region only
    2 'DL' symbols+10 'unknown+1 'empty'+1 'UL' symbol
    3 'DL' symbols+9 'unknown+1 'empty'+1 'UL' symbol
    2 'DL' symbols+9 'unknown+1 'empty'+2 'UL' symbols
    3 'DL' symbols+8 'unknown+1 'empty'+2 'UL' symbols
    2 'DL' symbols+1 'empty'+10 'unknown+1 'UL' symbol
    3 'DL' symbols+1 'empty'+9 'unknown+1 'UL' symbol
    2 'DL' symbols+1 'empty'+9 'unknown+2 'UL' symbols
    3 'DL' symbols+1 'empty'+8 'unknown+2 'UL' symbols
  Data and control regions
    1 'DL' symbol+13 'unknown' symbols (assuming GC PDCCH is on the $1^{st}$ symbol only)
    2 'DL' symbols+12 'unknown' symbols (assuming GC PDCCH is on the $1^{st}$ and $2^{nd}$ symbols)
    14 'unknown' symbols Therefore, total 50 combinations of slot formats were identified for a single slot. If all the slot formats are used, 6 bits are necessary to indicate the slot format for a single slot. Since not all the formats may be utilized by the NW for a given deployment, a subset of slot formats may be selected by the NW.

KT 5G-SIG TS 36.213 describes DL common signal (e.g. system information, paging, or RAR) and UL control signal as follows:

UE Procedure for Receiving the Physical Downlink Shared Channel

A UE shall upon detection of a PDCCH with DCI format 1, 1A, 1B, 1C, 1D, 2 or 2A intended for the UE in a subframe, decode the corresponding PDSCH in the same subframe with the restriction of the number of transport blocks defined in the higher layers.

If a UE is configured by higher layers to decode PDCCH with CRC scrambled by the SI-RNTI, the UE shall decode the PDCCH and the corresponding PDSCH according to any of the combinations defined in table 7.1-1. The scrambling initialization of PDSCH corresponding to these PDCCHs is by SI-RNTI.

[Table 7.1-1 of 3GPP TS 36.213 v14.3.0, entitled "PDCCH and PDSCH configured by SI-RNTI", is reproduced as FIG. 5]

If a UE is configured by higher layers to decode PDCCH with CRC scrambled by the P-RNTI, the UE shall decode the PDCCH and the corresponding PDSCH according to any of the combinations defined in table 7.1-2. The scrambling initialization of PDSCH corresponding to these PDCCHs is by P-RNTI.

[Table 7.1-2 of 3GPP TS 36.213 v14.3.0, entitled "PDCCH and PDSCH configured by P-RNTI", is reproduced as FIG. 6]

If a UE is configured by higher layers to decode PDCCH with CRC scrambled by the RA-RNTI, the UE shall decode the PDCCH and the corresponding PDSCH according to any of the combinations defined in table 7.1-3. The scrambling initialization of PDSCH corresponding to these PDCCHs is by RA-RNTI.

When RA-RNTI and either C-RNTI or SPS C-RNTI are assigned in the same subframe, UE is not required to decode a PDSCH indicated by a PDCCH with a CRC scrambled by C-RNTI or SPS C-RNTI.

[Table 7.1-3 of 3GPP TS 36.213 v14.3.0, entitled "PDCCH and PDSCH configured by RA-RNTI", is reproduced as FIG. 7]

UE Procedure for Determining Physical Uplink Control Channel Assignment

Uplink control information (UCI) in subframe n shall be transmitted on PUCCH using format 1/1a/1b or 2/2a/2b if the UE is not transmitting on PUSCH in subframe n on PUSCH if the UE is transmitting on PUSCH in subframe n unless the PUSCH transmission corresponds to a Random Access Response Grant or a retransmission of the same transport block as part of the contention based random access procedure, in which case UCI is not transmitted Throughout this section, subframes are numbered in monotonically increasing order; if the last subframe of a radio frame is denoted k, the first subframe of the next radio frame is denoted k+1.

The following combinations of uplink control information on PUCCH are supported:

HARQ-ACK using PUCCH format 1a or 1b
HARQ-ACK using PUCCH format 1b with channel selection
Scheduling request (SR) using PUCCH format 1
HARQ-ACK and SR using PUCCH format 1a or 1b
CQI using PUCCH format 2
CQI and HARQ-ACK using PUCCH format
2a or 2b for normal cyclic prefix
2 for extended cyclic prefix Some or all of the following terminology and assumption may be used hereafter.

BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.

TRP: A transmission and reception point provides network coverage and directly communicates with UEs. TRP could also be referred to as distributed unit (DU) or network node.

Cell: A cell is composed of one or multiple associated TRPs, i.e. coverage of the cell is composed of coverage of all associated TRP(s). One cell is controlled by one BS. Cell could also be referred to as TRP group (TRPG).

NR-PDCCH: A channel carries downlink control signal which is used to control communication between a UE and a network side. A network transmits NR-PDCCH on configured control resource set (corset) to the UE.

UL-control signal: At least comprise scheduling request (SR), channel state information (CSI), HARQ-ACK/NACK for downlink transmission Slot: A scheduling unit in NR. Slot duration is 7 or 14 OFDM symbols considering up to 60 kHz subcarrier spacing (SCS) with normal cyclic prefix (NCP). Slot duration is 14 OFDM symbols considering SCS higher than 60 kHz with NCP.

Slot format information (SFI): Information used to define transmitted direction of symbols in a slot. Transmitted direction may be downlink, uplink, or unknown.

DL common signal: A data channel carrying system information, paging, RAR.

DL URLLC: A UE is configured with a corset to monitor for DL URLLC control indicating DL URLLC transmission. The corset can be configured on middle symbol of a slot. The DL URLLC transmission may be transmitted on the following few symbols of the corset.

UL URLLC: A UE is configured with uplink resources for grant free transmission to meet requirement of URLLC.

For network side:

NR using beamforming could be standalone, i.e. UE can directly camp on or connect to NR.
NR using beamforming and NR not using beamforming could coexist, e.g. in different cells.

TRP would apply beamforming to both data and control signaling transmissions and receptions, if possible and beneficial.
Number of beams generated concurrently by TRP depends on TRP capability, e.g. maximum number of beams generated concurrently by different TRPs may be different.
Beam sweeping is necessary, e.g. for the control signaling to be provided in every direction.

Downlink timing of TRPs in the same cell are synchronized.

RRC layer of network side is in BS.

TRP should support both UEs with UE beamforming and UEs without UE beamforming, e.g. due to different UE capabilities or UE releases.

For UE side

UE may perform beamforming for reception and/or transmission, if possible and beneficial.
Number of beams generated concurrently by UE depends on UE capability, e.g. generating more than one beam is possible.
Beam(s) generated by UE, e.g. call UE beam, is wider than beam(s) generated by TRP, gNB, or eNB, e.g. called TRP beam or NW beam.
Beam sweeping for transmission and/or reception is generally not necessary for user data but may be necessary for other signaling, e.g. to perform measurement.

Not every UE supports UE beamforming, e.g. due to UE capability or UE beamforming is not supported in NR first (few) release(s).

One UE is possible to generate multiple UE beams concurrently and to be served by multiple serving beams from one or multiple TRPs of the same cell.
Same or different (DL or UL) data could be transmitted on the same radio resource via different beams for diversity or throughput gain.

There are at least two UE (RRC) states: connected state (or called active state) and non-connected state (or called inactive state or idle state). Inactive state may be an additional state or belong to connected state or non-connected state.

In wireless communication system, transmission direction no matter downlink from NW (Network) to UE or uplink from UE to NW needs to be configured appropriately.

In LTE, there are two basic frame structures TDD (Time Division Duplex) and FDD (Frequency Division Duplex). For FDD, downlink and uplink are separated via paired frequency band. On the other hand, transmission directions in TDD are separated by different time. Furthermore, with respect to multiple DL/UL configuration in current LTE spec, NW can semi-statically configure based on DL and UL traffic.

In 5G NR, in order to utilize radio resources more efficiently, it would be generally better to allow NW to adjust transmission direction dynamically based on current DL/UL traffic. Unlike LTE, based on 3GPP TSG RAN WG1 AH Meeting #1701 RAN1 Chairman's Notes, a group common PDCCH can indicate slot format of current slot and/or later slot(s). In addition, a UE-specific DCI can also indicate DL/UL starting symbol and/or ending symbol of a slot in order to adapt slot format. In other words, the UE-specific DCI can indicate slot format of current slot and/or later slot(s).

Furthermore, transmission on high frequency band, like above 6 GHz or even to 100 GHz, is considered in 5G design. Signal processing technique such as beamforming is considered to overcome dramatic power decay of transmission on higher frequency carrier band. In addition, considering coverage in a NR cell, multiple TRPs are proposed to solve the coverage issue; where each TRP is a distributed unit of NW and directly communicates with UEs.

Based on definition of group common PDCCH, different group common PDCCH may indicate different SFI. NW may adjust slot format based on DL/UL traffic amount of different group. A group can be constructed based on same characteristic such as same NW beam, same TRP, same RNTI, or a same area served by a set of NW beams. A UE in a NR (New Radio) cell may be served by multiple TRPs or different beams. Hence, a UE may belong to multiple groups, the UE may have different slot format information due to reception of multiple group common PDCCH from different TRPs or different beams. And some downlink symbol(s) of one slot format (for a group) may be partially or fully overlaps with some uplink symbol(s) of another slot format (for another group) in time domain. If the UE is full duplex, the UE may be ok to follow different slot format to receive downlink signal and transmit uplink signal simultaneously. However, considering half duplex UEs or UEs do not have capability to receive downlink signal and transmit uplink signal simultaneously, how the UEs determine the slot format to apply should be studied.

Figure 8:
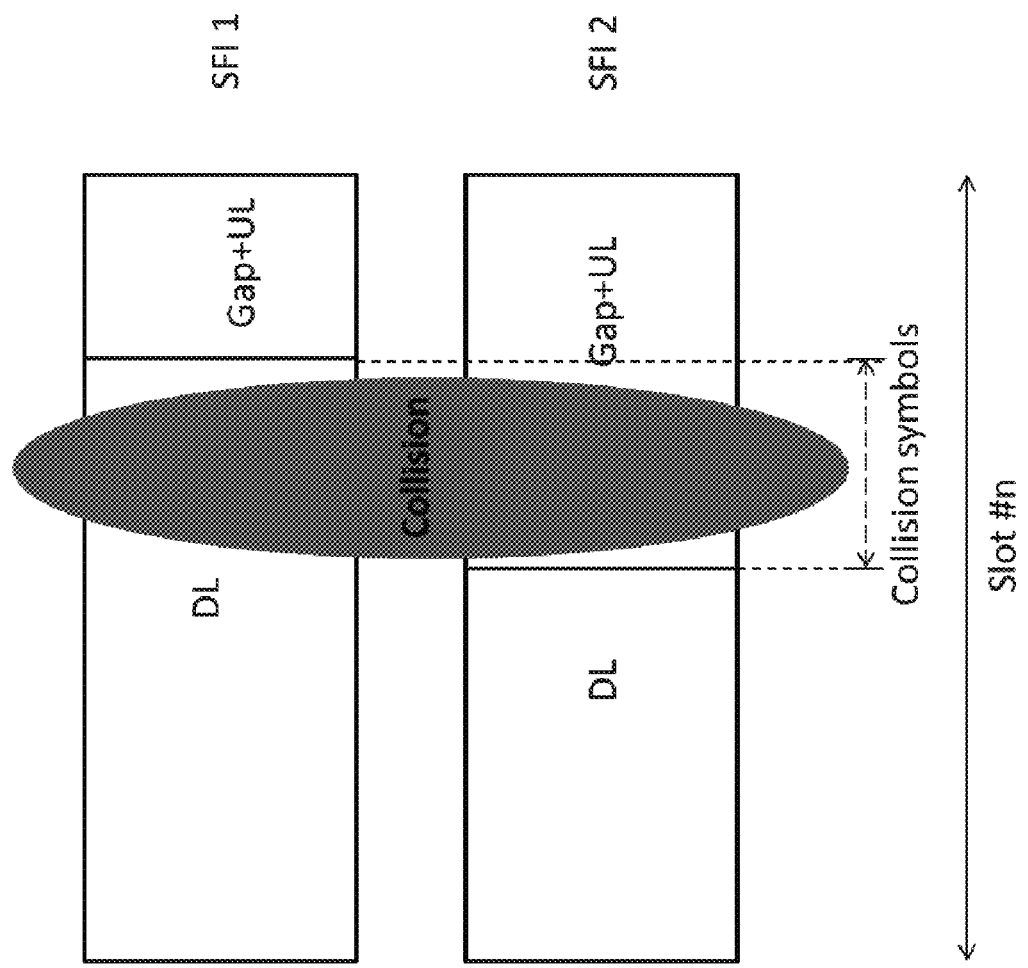
FIG. 8 is a diagram according to one exemplary embodiment.

FIG. 8 illustrates an example in which a UE belongs to two different groups with two different slot format information. Slot format information of group1 indicates a longer DL part, and slot format information of group2 has longer UL part.

A UE is configured with multiple slot format information (SFI) (for a cell). The multiple SFI indicate the same or different number of downlink symbols (and/or uplink symbols) in the same slot or in slots overlapped in time domain. Different SFIs can be for different groups. All beams of a TRP can constitute a group. Each different (TRP or serving) beam or beam group can be a group. Beams pointed to a certain area can constitute a group. For example, the UE can be configured with at least two SFI and a first SFI is for a first beam (group) and a second SFI is for a second beam (group). Applicable time period of the at least two SFI is partially or fully overlapped.

The UE has multiple UE beams. Furthermore, the UE communicates with a NW via the UE beams and the NW beams. A NW can indicate slot format information (of each group) through semi-static configuration. The NW can indicate slot format information (of each group) through GC PDCCH. The NW can indicate slot format information (of each group) through DCI indication.

Different SFIs (for the same cell) indicate different number of downlink symbols (and/or uplink symbols) in a specific slot or in slots overlapped in time domain. Some symbol(s) of the specific slot may have different transmitted directions indicated by the different SFI. Some time-domain overlapped symbol(s) of the slots may have different transmitted directions indicated by the different SFI.

If the UE is scheduled or configured to receive downlink signal or to monitor for downlink control signal on downlink symbol(s) of a specific slot indicated by a first SFI, wherein the downlink symbol(s) may partially or fully overlap with uplink symbol(s) (of the specific slot or another slot) indicated by a second SFI and the UE is not scheduled (or configured) to transmit uplink signal on the uplink symbol(s), the UE would receive the downlink signal or monitors the downlink control signal on the downlink symbol(s) (overlapped with the uplink symbol(s)). The first SFI can indicate longest downlink part of the specific slot.

Figure 10:
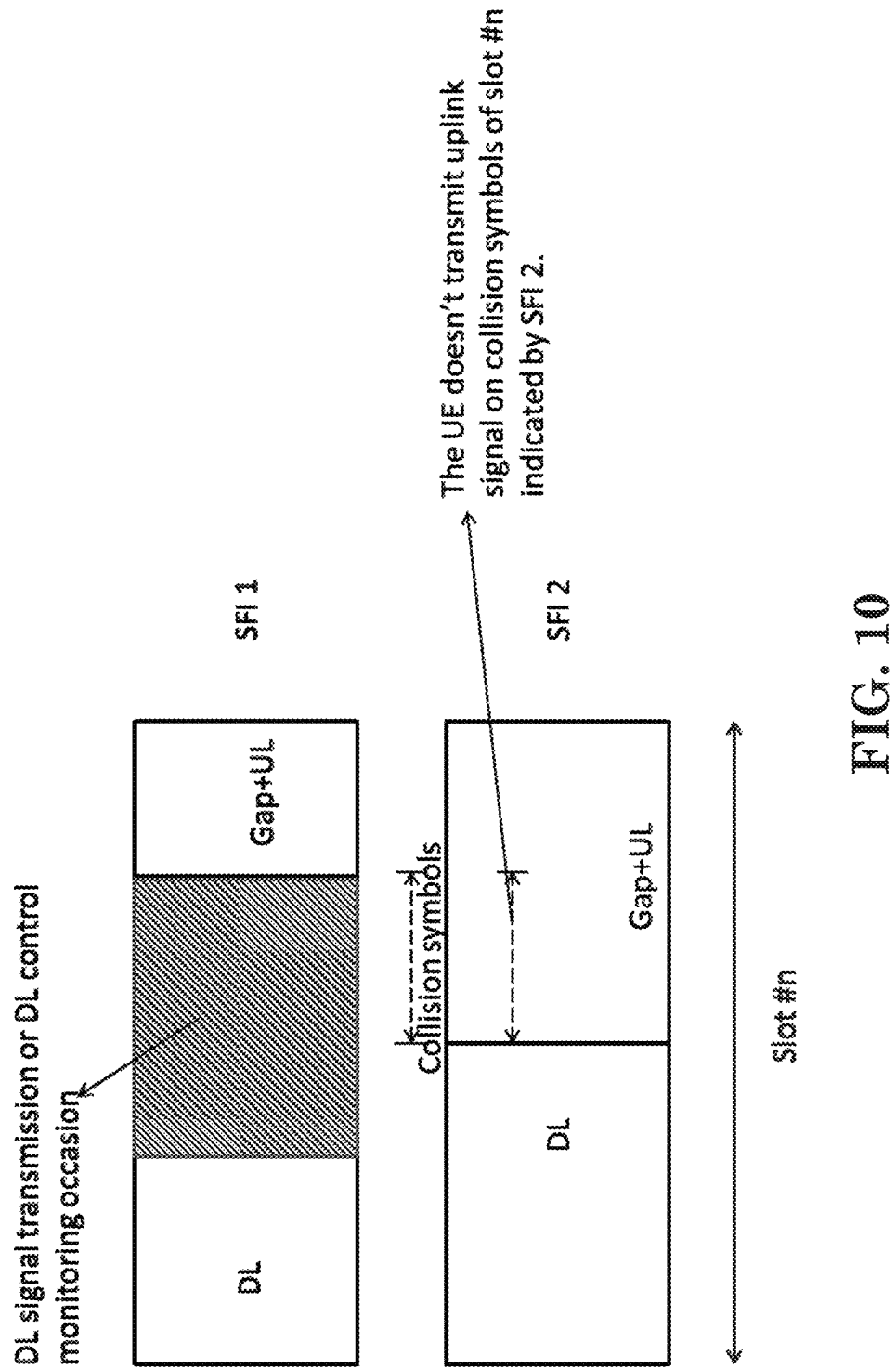
FIG. 10 is a diagram according to one exemplary embodiment.

For example, in FIG. 10, if the UE is configured to receive downlink signal or monitoring occasion on downlink symbols of slot #n indicated by SFI 1 (e.g. for a first NW or UE beam (group)) which may partially comprise some collision symbols indicated by SFI 2 with uplink direction (e.g. for a second NW or UE beam (group)) and no uplink signal needs to be transmitted on the collision symbols indicated by SFI 2, the UE would receive the downlink signal or monitors for the downlink control signal on (overlapped part of) the downlink symbols of slot #n indicated by SFI 1. Since there is no uplink transmission on the collision symbols of the slot #n indicated by SFI 2, the UE does not ignore downlink signal or monitoring occasion for downlink control signal.

If the UE is scheduled or configured to transmit uplink signal on uplink symbol(s) of a specific slot indicated by a first SFI, wherein the uplink symbol(s) may partially or fully overlap with downlink symbol(s) (of the specific slot or another slot) indicated by a second SFI and the UE is neither scheduled (or configured) to receive downlink signal nor to monitor for downlink control signal on the downlink symbol(s), the UE would transmit the uplink signal on the uplink symbol(s) (overlapped with the downlink symbol(s)). The first SFI can indicate longest uplink part of the slot.

Figure 11:
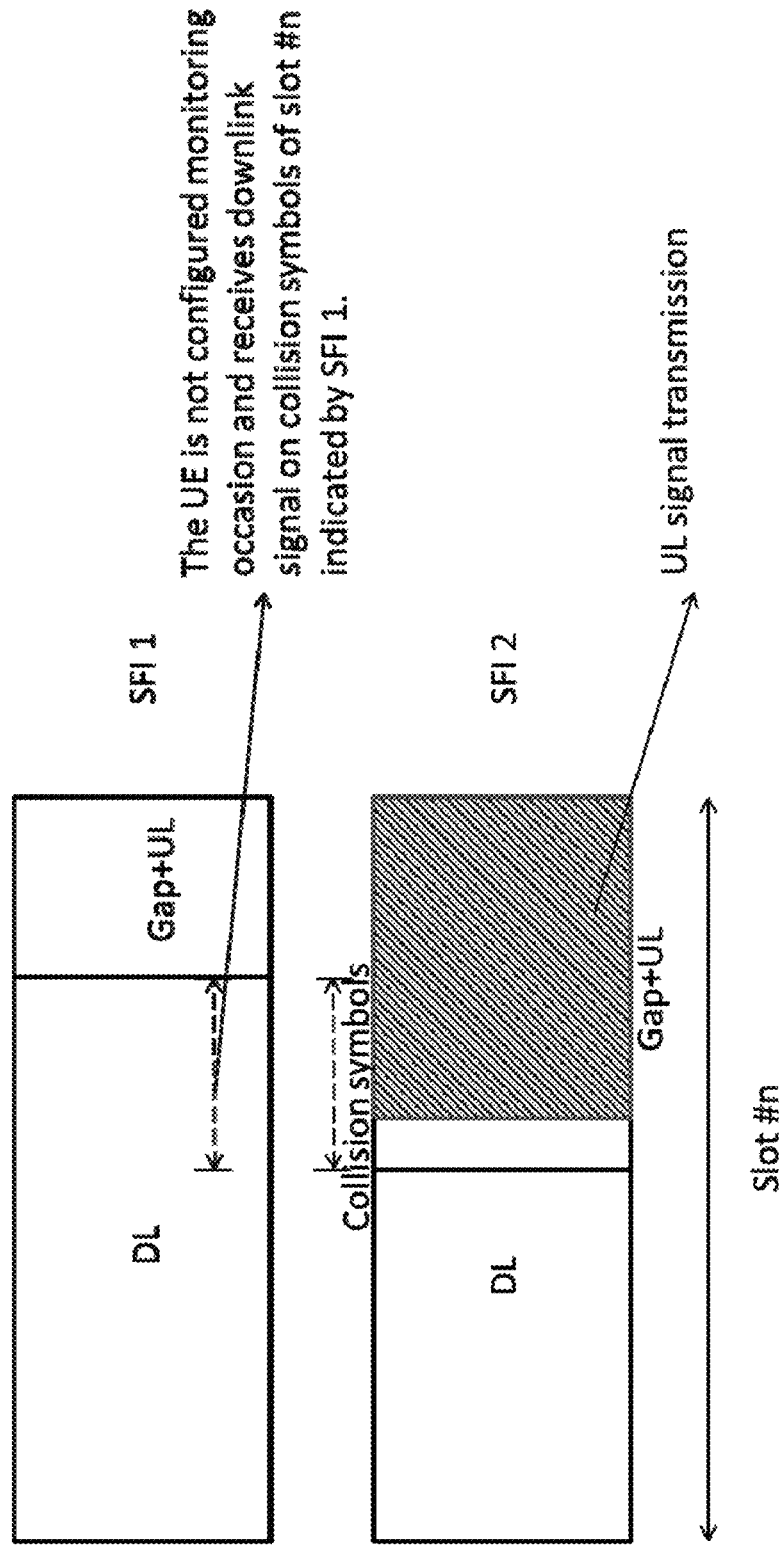
FIG. 11 is a diagram according to one exemplary embodiment.

For example, in FIG. 11, if the UE is configured to transmit uplink signal on uplink symbols of slot #n indicated by SFI2 (e.g. for a second NW or UE beam (group)) which may partially comprise collision symbols by SFI 1 with downlink direction (e.g. for a first NW or UE beam (group)) and there is no downlink transmission or configured monitoring occasion on the collision symbols of slot #n indicated by SFI 1, the UE would transmit the uplink signal on (overlapped part of) the uplink symbols of slot #n indicated by SFI 2. Since the UE does not expect that there is downlink transmission on the collision symbols, the UE does not ignore uplink signal.

If the UE is scheduled or configured to receive downlink signal or monitor for downlink control signal on downlink symbol(s) of a specific slot indicated by a first SFI and to transmit uplink signal on uplink symbol(s) of the specific slot (or another slot) indicated by a second SFI, wherein the downlink symbol(s) and the uplink symbol(s) are partially or fully overlapped in time domain, the UE could determine to receive, monitor, or transmit signal on the overlapped symbol(s) based on characteristic of the signal. The characteristic could include latency requirement of a signal. Signal characteristic could include which channel to carry the signal. Alternatively or additionally, the UE could determine to receive, monitor, or transmit signal on the overlapped symbol(s) based on reception timing of scheduling information associated with the signal.

Figure 9:
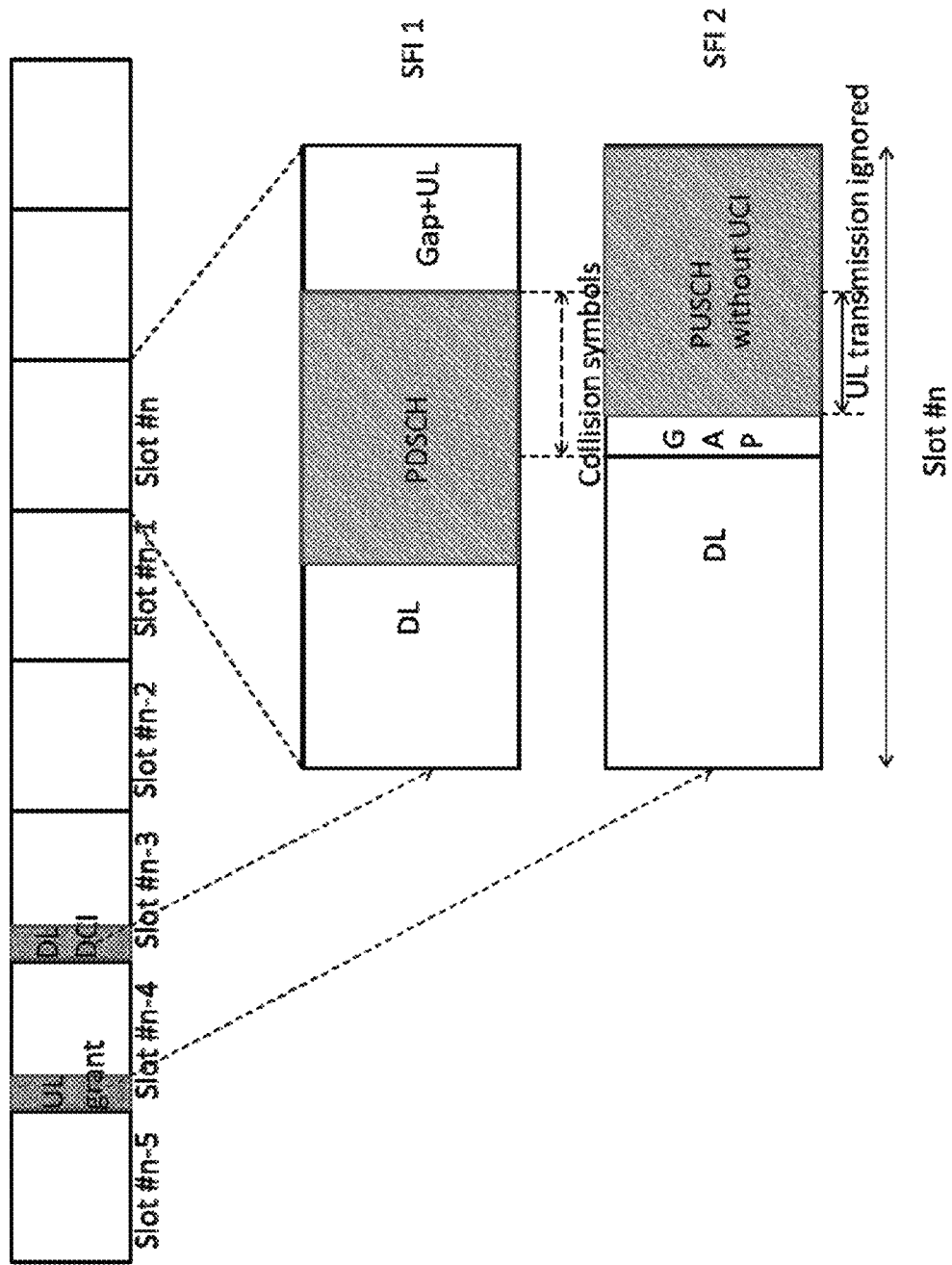
FIG. 9 is a diagram according to one exemplary embodiment.

For example, in FIG. 9, a UE received UL grant indicating slot format of slot #n via SFI 2 at slot #n−4 and received DL DCI indicating slot format of slot #n via SFI 1 at slot #n−3. One approach is that a NW coordinates latter indication of SFI aligning previous indicated SFI for the UE. In other words, transmitted direction of first symbol(s) indicated by the latter SFI is aligned with transmitted direction of second symbol(s) indicated by the previous SFI. The first symbol(s) and the second symbol(s) are partially or fully overlapped in time domain. Slot(s) of the first symbol(s) and slot(s) of the second symbol(s) are partially or fully overlapped in time domain. Then, it could mean that NW is not allowed to indicate transmitted direction of the first symbol(s) different from transmitted direction of the second symbol(s). The other approach is that the UE abides the latter indication of SFI.

One or multiple of following rules can be applied by a UE to decide whether to receive/monitor downlink signal or transmit uplink signal (on collision symbol(s)):

Rule 1: If there is at least one monitoring occasion for delay sensitive signal on downlink symbol(s) of a specific slot indicated by a first SFI, wherein the downlink symbol(s) may partially or fully overlap with uplink symbol(s) (of the specific slot or another slot) indicated by a second SFI, the UE could monitor for the delay sensitive signal on the downlink symbol(s) (overlapped with the uplink symbol(s)) of the specific slot.

The UE is scheduled (or configured) to transmit uplink signal on the uplink symbol(s). The UE may not transmit the uplink signal on the uplink symbol(s) (overlapped with the downlink symbol(s)). Alternatively, the UE is not scheduled (or configured) to transmit the uplink signal on the uplink symbol(s). The delay sensitive signal could be a signal transmitted via a specific numerology, a specific channel, a mini slot, or etc. The delay sensitive signal could be a signal to carry control information or data.

If there are multiple monitoring occasions for delay sensitive signal on downlink symbol(s) of the slot indicated by more than two SFI, the UE could apply SFI of one of the two SFI indicating longest downlink part of the slot. Monitoring occasion is specified as URLLC monitoring occasion. For example, in FIG. 8, if the UE is configured to monitor URLLC transmission on downlink symbols of the slot indicated by SFI 1 comprising collision symbols, the UE would monitor URLLC transmission on downlink symbols of the slot indicated by SFI 1. For example, in FIG. 8, although the UE may be configured to transmit uplink signal on uplink symbols of the slot indicated by SFI 2 comprising the collision symbols, the UE prioritizes to monitor URLLC transmission on downlink symbols of the slot indicated by SFI 1. Furthermore, the uplink signal can be non-delay sensitive data channel or control channel. Downlink delay sensitive signal is more important than the uplink signal. NW can schedule uplink resources for uplink URLLC apart from downlink URLLC monitoring occasion.

Rule 2: If there is at least one uplink resource configured for delay sensitive signal on uplink symbol(s) of a specific slot indicated by a first SFI, wherein the uplink symbol(s) may partially or fully overlap with downlink symbol(s) indicated by a second SFI, the UE could transmit the delay sensitive uplink signal on the uplink symbol(s) (overlapped with the downlink symbol(s)) of the specific slot. If there are multiple uplink resources on uplink symbols of the slot indicated by more than two SFI, the UE could apply SFI of one of the two SFI indicating longest uplink part of the slot.

The UE is scheduled (or configured) to monitor or receive downlink signal on the downlink symbol(s). The UE may not monitor or receive the downlink signal on the downlink symbol(s) (overlapped with the uplink symbol(s)). Alternatively, the UE is not scheduled (or configured) to monitor or receive the downlink signal on the downlink symbol(s). The delay sensitive signal could be a signal transmitted via a specific numerology, a specific channel, a mini slot, or etc. The delay sensitive signal could be a signal to carry control information or data.

Delay sensitive transmission refers to URLLC transmission. For example, in FIG. 8, if the UE is configured with resources for URLLC transmission on uplink symbols of the slot indicated by SFI 2 comprising collision symbols, the UE could transmit uplink URLLC through configured resources on uplink symbols of the slot indicated by SFI 2. For example, in FIG. 8, although the UE may be configured to receive downlink signal on downlink symbols of the slot indicated by SFI 1, the UE prioritizes to transmit uplink URLLC on uplink symbols of the slot indicated by SFI 2. Furthermore, the downlink signal can be non-delay sensitive data channel or control channel for non-delay sensitive transmission. Uplink delay sensitive signal is more important than the downlink signal.

Rule 3: If the UE is scheduled or configured to receive DL common signal on downlink symbol(s) of a specific slot indicated by a first SFI, wherein the downlink symbol(s) may partially or fully overlap with uplink symbol(s) (of the specific slot or another slot) indicated by a second SFI, the UE could receive the DL common signal on the downlink symbol(s) (overlapped with the uplink symbol(s)) of the specific slot. If the UE is configured to receive multiple DL common signals on downlink symbol(s) of the slot indicated by more than two SFI, the UE could apply SFI of one of the two SFI indicating longest downlink part of the slot.

The UE is scheduled (or configured) to transmit uplink signal on the uplink symbol(s). The UE may not transmit the uplink signal on the uplink symbol(s) (overlapped with the downlink symbol(s)). Alternatively, the UE is not scheduled (or configured) to transmit the uplink signal on the uplink symbol(s). The uplink signal is not delay sensitive.

The DL common signal has higher priority than uplink non delay sensitive signal. For example, in FIG. 8, the UE is configured to receive DL common signal on downlink symbols of the slot indicated by SFI 1 comprising collision symbols and configured to transmit uplink signal which is not delay sensitive on uplink symbols of the slot indicated by SFI 2 comprising collision symbols. The UE receives DL common signal on downlink symbols of the slot indicated by SFI 1. The DL common signal could refer to data channel carrying scheduled system information, data channel carrying scheduled paging information, or data channel carrying scheduled RAR information. Furthermore, the uplink signal can be non-delay sensitive data channel, control channel. In general, the DL common signal is more important than the uplink signal.

Rule 4: If the UE is scheduled or configured to transmit uplink control signal on uplink symbol(s) of a specific slot indicated by a first SFI, wherein the uplink symbol(s) may partially or fully overlap with downlink symbol(s) (of the specific slot or another slot) indicated by a second SFI, the UE could transmit the uplink control signal on the uplink symbols (overlapped with the downlink symbol(s)) of the specific slot. If the UE is configured to transmit control signal on uplink symbol(s) of the slot indicated by more than two SFI, the UE could apply SFI of one of the two SFI indicating longest uplink part of the slot.

The UE is scheduled (or configured) to monitor or receive downlink signal on the downlink symbol(s). The UE may not monitor or receive the downlink signal on the downlink symbol(s) (overlapped with the uplink symbol(s)). Alternatively, the UE is not scheduled (or configured) to monitor or receive the downlink signal on the downlink symbol(s). The downlink signal is not delay sensitive. The downlink signal is not a downlink common signal. The UL control signal may be SR, SRS, CSI, HARQ feedback, or etc.

The UL control signal has higher priority than downlink non delay sensitive signal. For example, in FIG. 8, the UE is configured to transmit UL control signal on uplink symbols of the slot indicated by SFI 2 comprising collision symbols and configured to receive downlink signal which is not delay sensitive on downlink symbols of the slot indicated by SFI 1 comprising collision symbols. The UE transmits the UL signal on uplink symbols of the slot indicated by SFI 2. Furthermore, the downlink signal can be non-delay sensitive data channel or control channel for non-delay sensitive transmission. The UL control signal is more important than the downlink signal.

Rule 5: If the UE transmits uplink data with uplink control information via an uplink grant on uplink symbol(s) of a specific slot indicated by a first SFI, wherein the uplink symbol(s) may partially or fully overlap with downlink symbol(s) (of the specific slot or another slot) indicated by a second SFI, the UE can transmit the uplink data with the uplink control information on the uplink symbols (overlapped with the downlink symbol(s)) of the specific slot. If the UE is configured to transmit uplink data with uplink control information on uplink symbol(s) of the slot indicated by more than two SFI, the UE could apply SFI of one of the two SFI indicating longest uplink part of the slot.

The UE is scheduled (or configured) to monitor or receive downlink signal on the downlink symbol(s). The UE may not monitor or receive the downlink signal on the downlink symbol(s) (overlapped with the uplink symbol(s)). Alternatively, the UE is not scheduled (or configured) to monitor or receive the downlink signal on the downlink symbol(s). The downlink signal may be downlink data. The downlink signal is not delay sensitive, a downlink common signal, and/or a downlink control signal. The UL control information may be SR (Scheduling Request), SRS (Sounding Reference Signal), CSI (Channel State Information), HARQ (Hybrid Automatic Repeat Request) feedback, or etc.

The UL data with uplink control signal transmitted via an uplink grant has higher priority than downlink non-delay sensitive signal.

Rule 6: If the UE is scheduled or configure for downlink data reception on downlink symbol(s) of a specific slot indicated by a first SFI and is scheduled or configured for uplink data transmission on uplink symbol(s) of the specific slot (or another slot) indicated by a second SFI, wherein the downlink symbol(s) and the uplink symbol(s) may be partially or fully overlapped, the UE could determine whether to receive the downlink data or transmit the uplink data based on reception timing of scheduling information associated with the data.

If reception timing of scheduling information corresponding to the downlink data reception is later than scheduling information indicating the uplink data transmission, the UE could receive the downlink data on the downlink symbol(s) of the specific slot indicated by the first SFI. The UE may not transmit the uplink data on the uplink symbol(s).

If reception timing of scheduling information indicating the uplink data transmission is later than scheduling information corresponding to the downlink data reception, the UE could transmit the uplink data on the uplink symbol(s) of the specific slot (or the another slot) indicated by the second SFI.

Furthermore, both received timing of scheduling information corresponding to the downlink data reception and indicating the uplink data transmission are earlier than slot #n. The scheduling information corresponding to the downlink data reception can indicate the first SFI of slot #n. If scheduling information corresponding to the downlink data reception is received before slot #n, the UE could be aware of SFI of slot #n by the first SFI. The scheduling information indicating uplink data transmission can indicate the second SFI of slot #n. Before slot #n, the UE can be aware of SFI of slot #n by the second SFI.

If scheduling information corresponding to the downlink data reception is transmitted on slot #n and scheduling information indicating uplink data transmission is transmitted before slot #n, the UE could transmit uplink data on the uplink symbol(s) of the specific slot (or the another slot) indicated by the second SFI. Before the UE decoded the scheduling information corresponding to the downlink data reception successfully, the UE does not know there is transmission on downlink symbols of the specific slot indicated by the first SFI.

Rule 7: If the UE is scheduled or configured to receive signal or monitor for signal on downlink symbol(s) of a specific slot indicated by a first SFI and is scheduled or configured to transmit signal on uplink symbol(s) of the specific slot (or another slot) indicated by a second SFI where ending symbol index of the downlink symbol(s) is smaller than starting symbol index of the uplink symbol(s), the UE would receive signal or monitors for signals on the downlink symbol(s) until the very last symbol of the downlink symbol(s), and would transmit signal on the uplink symbol(s) from the very first symbol of the uplink symbol(s).

If the UE is scheduled or configured to receive signal or monitor for signal on downlink symbol(s) of a specific slot indicated by a first SFI and is scheduled or configured to transmit signal on uplink symbol(s) of the specific slot (or another slot) indicated by a second SFI where ending symbol index of the uplink symbol(s) is smaller than starting symbol index of the downlink symbol(s), the UE would transmit signal on the uplink symbol(s) until the very last symbol of the uplink symbol(s) and receives signal or monitors for signals on the downlink symbol(s) from the very first symbol of the downlink symbol(s).

Figure 12:
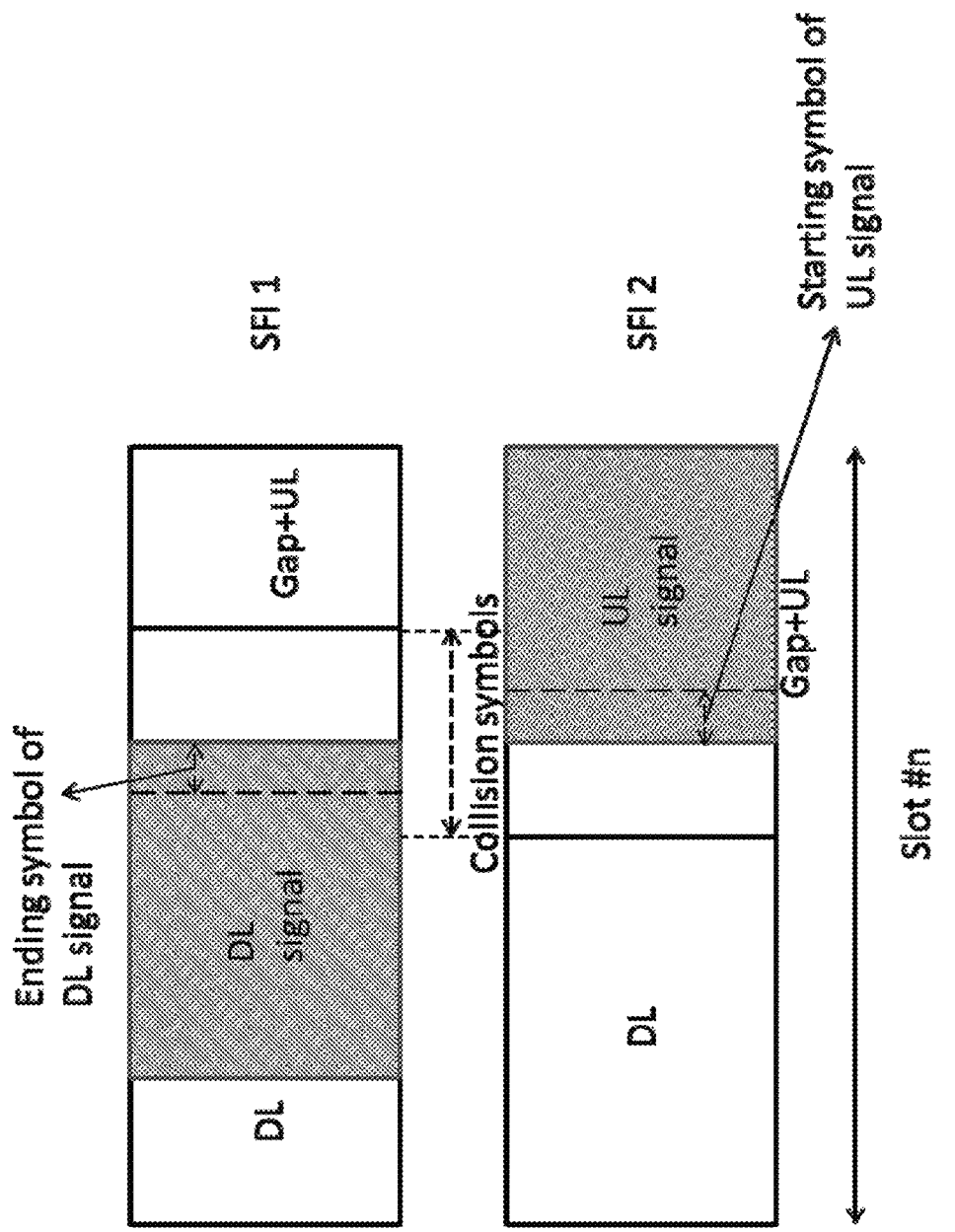
FIG. 12 is a diagram according to one exemplary embodiment.

For example, in FIG. 12, the UE is configured to receive downlink signal or monitor for signal on downlink symbols comprising collision symbols of slot #n indicated by a first SFI and configured to transmit signal on uplink symbols comprising collision symbols of slot #n indicated by SFI 2. If symbol index of ending symbol of the downlink symbols is smaller than symbol index of starting symbols, the UE would receive signal or monitor for signals on the downlink symbols until the ending symbol, and would transmit signal on the uplink symbols from the starting symbol.

Figure 13:
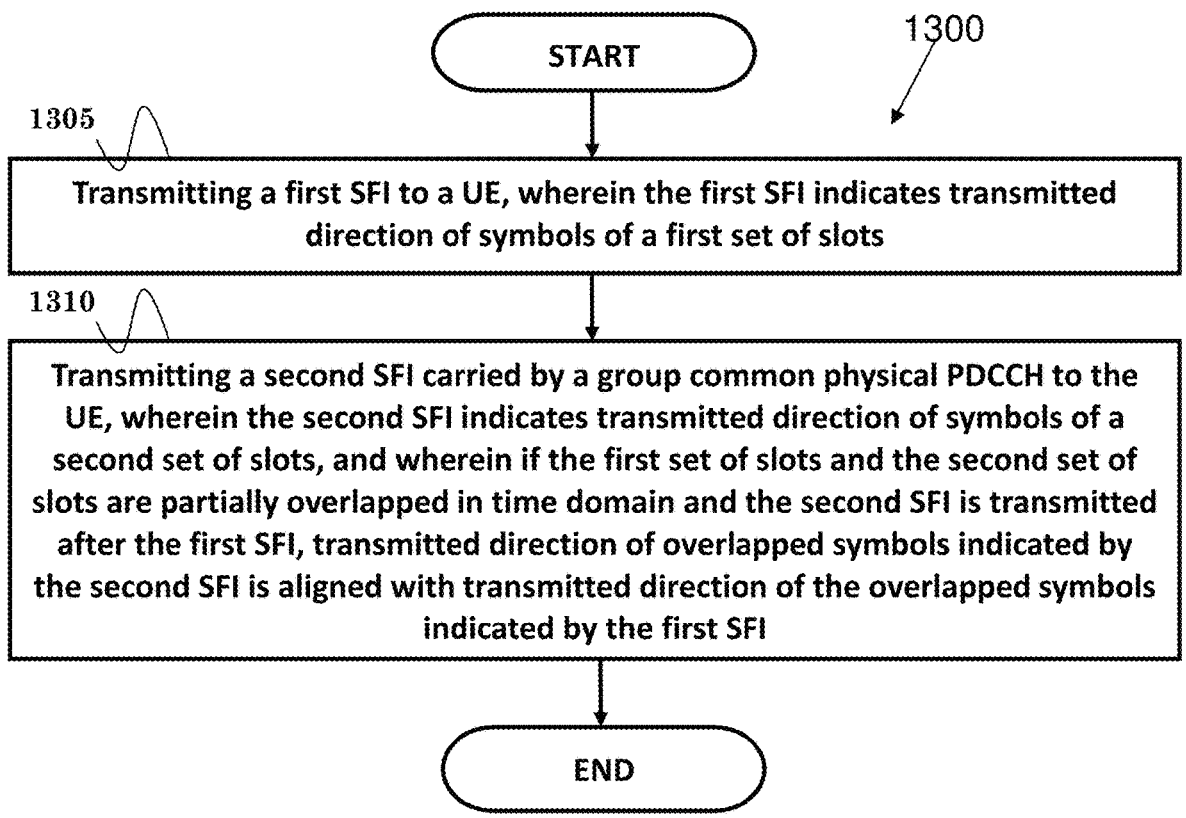
FIG. 13 is a flow chart according to one exemplary embodiment.

For example, the UE decides whether to perform downlink signal reception or uplink signal transmission in overlapped symbol(s) at least based on priority of the signal. One or multiple of following priority rules may be applied (combination of certain rules is possible):

Delay sensitive control signal is prioritized over non-delay sensitive control signal and data Delay sensitive data signal is prioritized over non-delay sensitive control signal and data Control signal is prioritized over data Common control signal is prioritized over dedicated control signal DL control signal is prioritized over UL control signal Data with control information is prioritized over data FIG. 13 is a flow chart 1300 according to one exemplary embodiment from the perspective of a network node. In step 1305, the network node transmits a first SFI to a UE, wherein the first SFI indicates transmitted direction of symbols of a first set of slots. In step 1310, the network node transmits a second SFI carried by a group common PDCCH to the UE, wherein the second SFI indicates transmitted direction of symbols of a second set of slots, and wherein if the first set of slots and the second set of slots are partially overlapped in time domain and the second SFI is transmitted after the first SFI, transmitted direction of overlapped symbols indicated by the second SFI is aligned with transmitted direction of the overlapped symbols indicated by the first SFI.

In one embodiment, the first SFI and the second SFI could be transmitted via different beams or different transmission and reception points (TRPs). The first SFI and the second SFI could be for different beams and/or for the same cell. Alternatively, the first SFI and the second SFI could be indicated on a per component carrier basis, per numerology basis, or per bandwidth part basis.

In one embodiment, the cell could operate in FDD (Frequency Division Duplex) or in paired spectrum.

In one embodiment, transmitted direction of a symbol could be indicated as downlink, uplink, or flexible. Alternatively, transmitted direction of a symbol could be indicated as downlink, uplink, unknown, empty, gap, other, or flexible. Alternatively, transmitted direction of the overlapped symbols indicated by the second SFI is not allowed to be different from transmitted direction of the overlapped symbols indicated by the first SFI.

In one embodiment, the first SFI could be carried by the group common PDCCH or by a UE-specific downlink control information (DCI).

In one embodiment, the first SFI and the second SFI could be indicated on a per component carrier basis, per numerology basis, or per bandwidth basis.

Referring back to FIGS. 3 and 4, in one exemplary embodiment of a network node, the device 300 includes a program code 312 stored in the memory 310. The CPU 308 could execute program code 312 to enable the network node (i) to transmit a first SFI to a UE, wherein the first SFI indicates transmitted direction of symbols of a first set of slots, and (ii) to transmit a second SFI carried by a group common PDCCH to the UE, wherein the second SFI indicates transmitted direction of symbols of a second set of slots, and wherein if the first set of slots and the second set of slots are partially overlapped in time domain and the second SFI is transmitted after the first SFI, transmitted direction of overlapped symbols indicated by the second SFI is aligned with transmitted direction of the overlapped symbols indicated by the first SFI. Furthermore, the CPU 308 can execute the program code 312 to perform all of the above-described actions and steps or others described herein.

Figure 14:
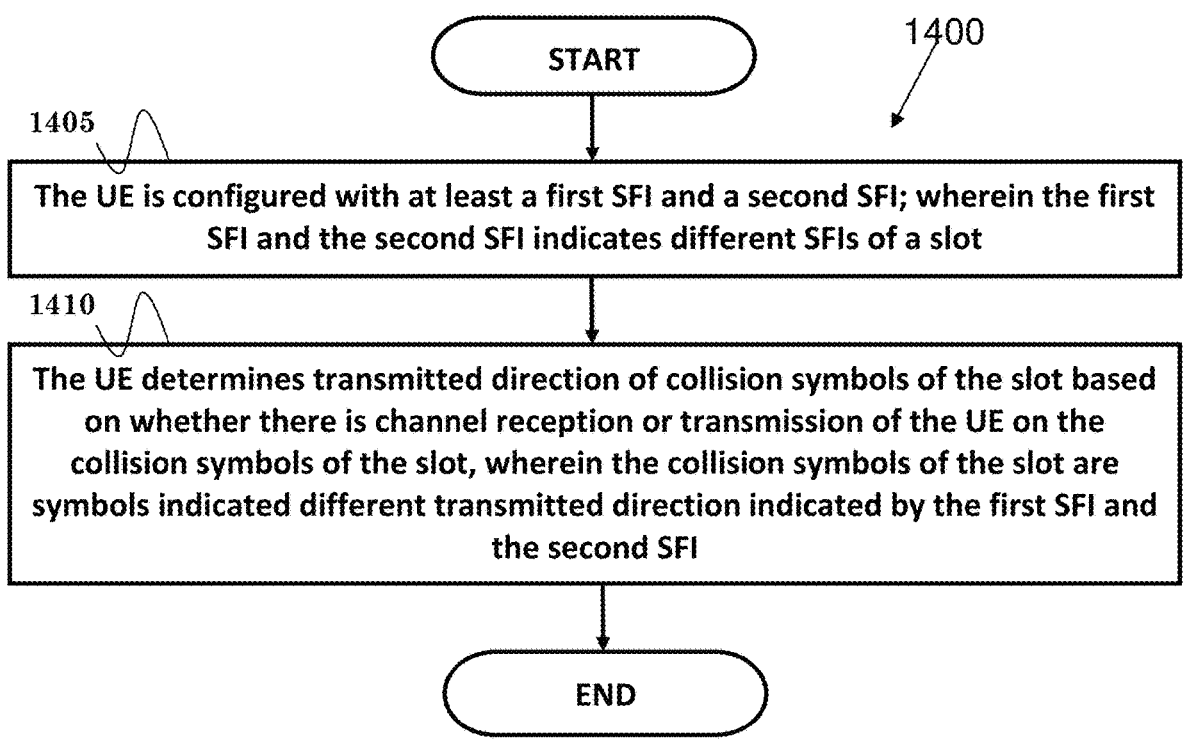
FIG. 14 is a flow chart according to one exemplary embodiment.

FIG. 14 is a flow chart 1400 according to one exemplary embodiment of a UE. In step 1405, the UE is configured with at least a first SFI and a second SFI; wherein the first SFI and the second SFI indicates different SFIs of a slot. In step 1410, the UE determines transmitted direction of collision symbols of the slot based on whether there is channel reception or transmission of the UE on the collision symbols of the slot, wherein the collision symbols of the slot are symbols indicated different transmitted direction by the first SFI and the second SFI.

In one embodiment, the UE could receive or transmit signal on symbols of the slot indicated by the first SFI which may comprise the collision symbols if the UE has channel reception or transmission on the collision symbols of the slot indicated by the first SFI and no channel usage on the collision symbols of the slot indicated by the second SFI.

In one embodiment, the first SFI could indicate a longest DL part of the slot among the configured SFI(s). The second SFI could also indicate a longest UL part of the slot among the configured SFI(s).

In one embodiment, if a control signal indicating the channel reception or transmission on the collision symbols of the slot is transmitted in the slot, the UE could consider there is no channel reception or transmission on the collision symbols of the slot when determining transmitted direction of the collision symbols of the slot. Alternatively, if the UE considers that there is channel reception and transmission on the collision symbols of the slot indicated by both the first SFI and the second SFI, the UE could determine transmitted direction of the collision symbols of the slot based on a rule.

In one embodiment, a first rule is if the channel reception or transmission on the collision symbols of the slot indicated by the first SFI is delay sensitive, the UE receives or transmits delay sensitive signal based on the first SFI. Delay sensitive transmission or reception could refer to URLLC transmission. Alternatively, delay sensitive channel reception could include the channel on the collision of the slot configured to monitor by the UE.

In one embodiment, a second rule is if the channel reception on the collision symbols of the slot indicated by the first SFI carries common scheduling signal, the UE could receive common scheduling signal based on the first SFI.

In one embodiment, a third rule is if channel transmission on the collision symbols of the slot indicated by the second SFI carries control signal, the UE could transmit uplink signal based on the second SFI.

In one embodiment, a fourth rule is if channel transmission on the collision symbols of the slot indicated by the second SFI is data channel scheduled by an uplink grant with uplink control signal, the UE could transmit the uplink data with the uplink control signal by the uplink grant based on the second SFI.

In one embodiment, a fifth rule is if channel reception on the collision symbols of the slot indicated by the first SFI is a data channel scheduled by a first downlink control signal and channel transmission on the collision symbols of the slot indicated by the second SFI is a data channel scheduled by a second downlink control signal, the UE could determine transmitted direction of the collision symbols of the slot based on received timing of the first downlink control signal and the second downlink signal. Alternatively, if the first downlink control signal is received later than the second downlink control signal, the UE could receive the data channel based on the first SFI. If the second downlink control signal is received later than the first downlink control signal, the UE could transmit the data channel based on the second SFI.

In one embodiment, prioritization of the rule is as order of the rules, wherein the first rule has highest prioritization.

In one embodiment, if channel reception is transmitted on downlink symbols comprising the collision symbols of the slot indicated by the first SFI and channel transmission is transmitted on uplink symbols comprising the collision symbols of the slot indicated by the second SFI; wherein symbol index of ending symbol of the downlink symbols is smaller than symbol index of starting symbol of the uplink symbols, the UE could take channel reception until the end of the ending symbol and takes channel transmission from the starting symbol.

Referring back to FIGS. 3 and 4, in one exemplary embodiment of a UE, the device 300 includes a program code 312 stored in the memory 310. The CPU 308 could execute program code 312 to enable the UE (i) to be configured with at least a first SFI and a second SFI; wherein the first SFI and the second SFI indicates different SFIs of a slot, and (ii) to determine transmitted direction of collision symbols of the slot based on whether there is channel reception or transmission of the UE on the collision symbols of the slot, wherein the collision symbols of the slot are symbols indicated different transmitted direction indicated by the first SFI and the second SFI. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a network node, comprising:
    transmitting a first slot format information (SFI) carried by a group common Physical Downlink Control Channel (PDCCH) to a User Equipment (UE), wherein the first SFI indicates transmitted direction of symbols of a first set of slots; and
    transmitting a second SFI carried by the group common physical downlink control channel (PDCCH) to the UE, wherein the second SFI indicates transmitted direction of symbols of a second set of slots and the second SFI is transmitted after the first SFI, and the first set of slots and the second set of slots are partially overlapped in time domain; and coordinating SFI aligning by a transmitted direction of overlapped symbols indicated by the second SFI with a transmitted direction of overlapped symbols indicated by the first SFI to prevent collision of the transmitted direction of overlapped symbols.

2. The method of claim 1, wherein the first SFI and the second SFI are transmitted via different beams or different transmission and reception points (TRPs).

3. The method of claim 1, wherein the first SFI and the second SFI are for different beams.

4. The method of claim 1, wherein the first SFI and the second SFI are for the same cell.

5. The method of claim 4, wherein the cell operates in Frequency Division Duplex (FDD) or in paired spectrum.

6. The method of claim 1, wherein the first SFI and the second SFI are indicated on a per component carrier basis, per numerology basis, or per bandwidth part basis.

7. The method of claim 1, wherein transmitted direction of a symbol is indicated as downlink, uplink, or flexible.

8. The method of claim 1, wherein transmitted direction of the overlapped symbols indicated by the second SFI is not allowed to be different from transmitted direction of the overlapped symbols indicated by the first SFI.

9. The method of claim 1, wherein the first SFI is carried by a UE-specific downlink control information (DCI).

10. A network node, comprising:
a control circuit;
a processor installed in the control circuit;
a memory installed in the control circuit and coupled to the processor;
wherein the processor is configured to execute a program code stored in the memory to:
transmit a first slot format information (SFI) carried by a group common Physical Downlink Control Channel (PDCCH) to a User Equipment (UE), wherein the first SFI indicates transmitted direction of symbols of a first set of slots; and
transmit a second SFI carried by the group common physical downlink control channel (PDCCH) to the UE, wherein the second SFI indicates transmitted direction of symbols of a second set of slots and the second SFI is transmitted after the first SFI, and the first set of slots and the second set of slots are partially overlapped in time domain; and
coordinate SFI aligning by a transmitted direction of overlapped symbols indicated by the second SFI with a transmitted direction of overlapped symbols indicated by the first SFI to prevent collision of the transmitted direction of overlapped symbols.

11. The network node of claim 10, wherein the first SFI and the second SFI are transmitted via different beams or different transmission and reception points (TRPs).

12. The network node of claim 10, wherein the first SFI and the second SFI are for different beams.

13. The network node of claim 10, wherein the first SFI and the second SFI are for the same cell.

14. The network node of claim 13, wherein the cell operates in Frequency Division Duplex (FDD) or in paired spectrum.

15. The network node of claim 10, wherein the first SFI and the second SFI are indicated on a per component carrier basis, per numerology basis, or per bandwidth part basis.

16. The network node of claim 10, wherein transmitted direction of a symbol is indicated as downlink, uplink, or flexible.

17. The network node of claim 10, wherein transmitted direction of the overlapped symbols indicated by the second SFI is not allowed to be different from transmitted direction of the overlapped symbols indicated by the first SFI.

18. The network node of claim 10, wherein the first SFI is carried by a UE-specific downlink control information (DCI).

* * * * *